Sept. 22, 1959      L. B. SMITH      2,905,111
APPARATUS FOR CUTTING STRAND MATERIAL
Filed March 1, 1956      2 Sheets-Sheet 1
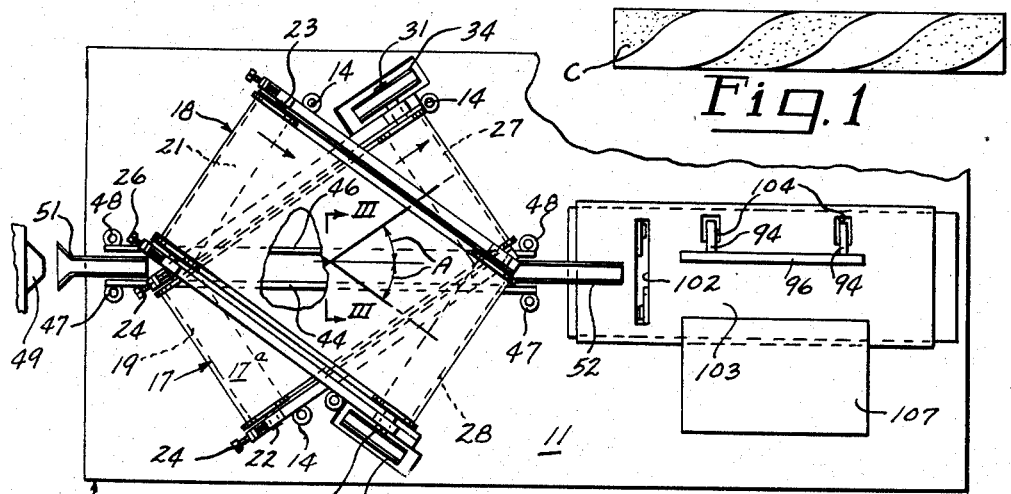
Fig.1
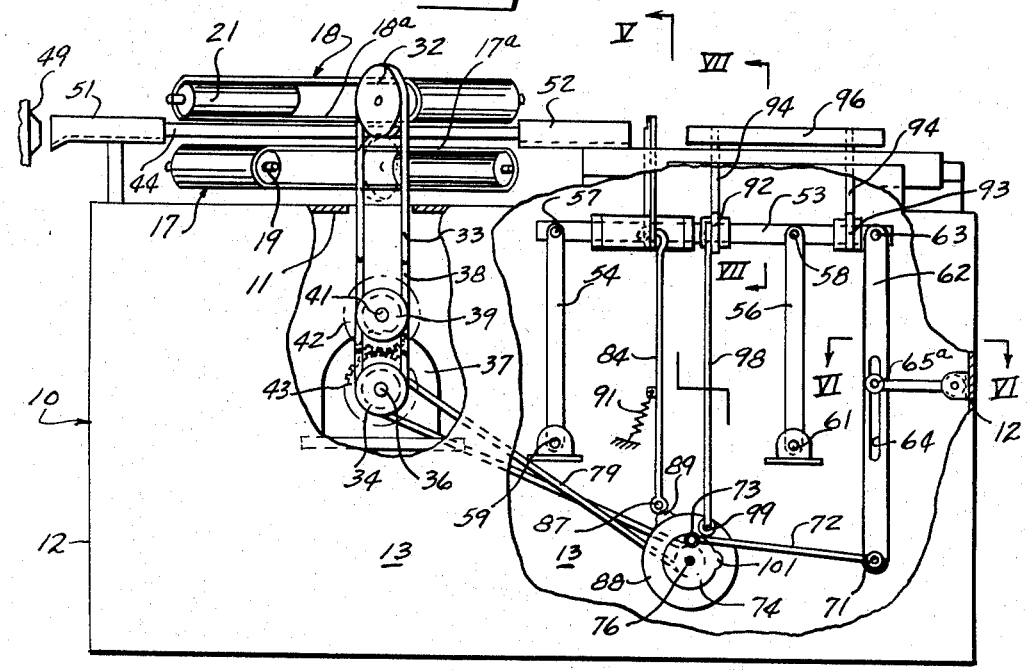
Fig.2
Fig.4
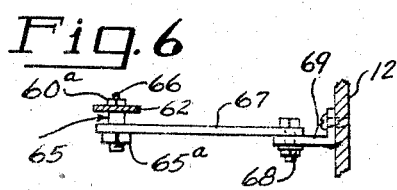
Fig.6
INVENTOR.
LLOYD B. SMITH
BY Jennings & Carter
ATTORNEYS INVENTOR.
LLOYD B. SMITH
BY
Jennings & Carter
ATTORNEYS Patented Sept. 22, 1959

2,905,111

APPARATUS FOR CUTTING STRAND MATERIAL

Lloyd B. Smith, Birmingham, Ala.

Application March 1, 1956, Serial No. 568,892

4 Claims. (Cl. 107—21)

My invention relates to an apparatus by means of which a round strand of material such as stick candy while still in plastic condition may be rotated for the purpose of ornamenting the same and if desired, twisted, and then cut into lengths.

In the manufacture of products such as striped stick candy, commercially called "barber pole" candy, it is customary to make ropes or strands of the white and red colored candy, the white generally being the greater by quantity, and to twist these together while in plastic condition. Heretofore, the twisting of such ropes or strands has been done both by hand and by certain forms of machines in which the candy was fed into a mandrel-like apparatus. After being twisted the still plastic strand or rope was fed to a cutting device which cut the rope into the usual short lengths customarily sold to the trade. In some instances the mandrel-like apparatus carried cutters which severed the candy while it was still in the mandrel and discharged it, already cut. In prior processes and apparatus the strands have been twisted by such apparatus which embodied chains, rollers, grippers and the like. Such processes and apparatus are expensive, the larger (1¾ inch diameter) size of candy is difficult to handle, and the product sometimes has not been twisted uniformly, decreasing its eye appeal and hence its market price.

In view of the foregoing it is a prime object of my invention to provide an apparatus of a type by which a strand or rope or round material may be rotated about its longitudinal axis by means of rotative forces having an axially directed component, whereby the strand is both rotated and pulled along axially.

Another object is to provide an apparatus of the character designated in which the strand may be held against rotation at a point removed from the place where it is acted upon by said rotative forces, thereby causing it to be twisted.

Another object is to provide an apparatus of the character designated in which the strand to be rotated is fed endwise between a pair of generally flat moving surfaces, the surfaces being spaced close enough together frictionally to engage opposite surfaces of the strand, said surfaces moving in paths which cross each other at an included angle of less than 180° on the edges thereof to which the strand is fed, whereby the strand is engaged substantially uniformly over a relatively long length thereof and in such manner that it is moved axially along while being rotated.

Another object is to provide an apparatus of the character described which is especially adapted to the production of "barber pole" stick candy, and one which results in a finished product having a uniform twist, uniform diameter, and generally an improved uniform appearance over candy manufactured by prior processes and apparatus.

Another object is to provide an apparatus embodying the steps set out above and including the additional step of severing the strand into lengths and removing the lengths without interrupting or slowing the axial movement of the strand as a whole.

A more detailed object is to provide apparatus for rotating a round strand of material which comprises a pair of crossed flat belts having their adjacent flights spaced apart to contact the strand, together with means to drive the belts whereby upon feeding the strand endwise between the belts the strand is rotated and moved axially along.

A further object is to provide apparatus of the character designated especially adapted to twist and cut into lengths a strand of semi-plastic candy, the cutting apparatus being a shear which operates in timed relation to the delivery of the twisted strand from between the belts, together with a discharge mechanism to move the lengths laterally out of the way of the oncoming strand.

The constructional features of my invention are illustrated in the accompanying drawings forming a part of this application, in which:

Fig. 1 is a plan view of a stick of "barber pole" candy of the kind which my improved process and apparatus are especially adapted to produce;

Fig. 2 is a plan view, partly broken away and showing in somewhat diagrammatic manner my improved apparatus;

Fig. 4 is a wholly diagrammatic side elevational view with certain parts broken away and in section and illustrating the several parts of my invention;

Fig. 6 is an enlarged detail sectional view taken generally along line VI—VI of Fig. 4.

Figure 3:
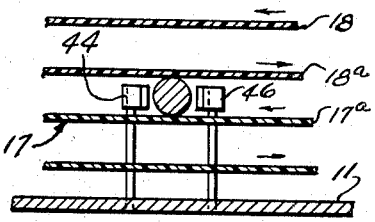
Fig. 3 is an enlarged detail sectional view taken generally along line III—III of Fig. 2 and showing a piece of stick candy in place between the belts of my improved apparatus.
Figure 5:
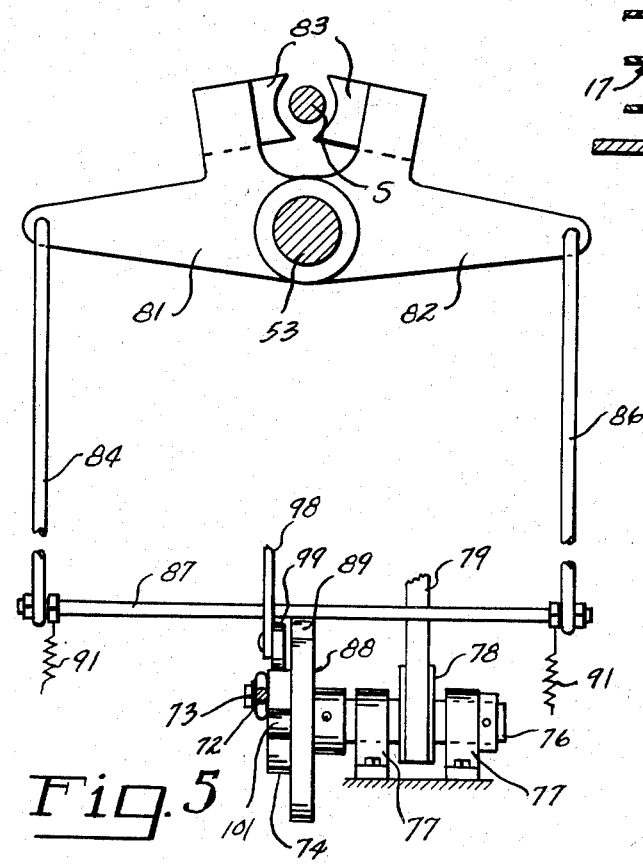
Fig. 5 is an enlarged detail sectional view taken generally along line V—V of Fig. 4.

Referring now to the drawings for a better understanding of my invention I show my improved apparatus as comprising a supporting base or frame indicated generally by the numeral 10. The supporting base may comprise essentially a sheet metal box, generally open, and having a top plate 11, end plates 12, and side plates 13. In the manner well understood I prefer to make all parts of my improved apparatus of material suitable for the purpose of making candy and which corresponds to standards of cleanliness applicable to the manufacture of food products.

Mounted on the top plate 11 on suitable supporting members or standards 14 are a pair of crossed belts indicated generally by the numerals 17 and 18. The belts may be made of cotton reinforced neoprene. The belts are supported on idler rollers 19 and 21, respectively, in turn mounted on shafts or axles 22 and 23, respectively. The belts may be tightened by means of take-up bolts 24 and 26, respectively. The belts pass around driven rollers 27 and 28, respectively, which are mounted on axles 31 and 29, respectively. Mounted on the ends of the shaft 29 is a pulley 32 over which passes a belt 33. The belt 33 passes over a pulley 34 on the shaft 36 of an electric motor 37. The pulleys are of such sizes that the belts are driven at substantially the same speed.

Very similarly to the belt just described, there is a pulley 34a on the end of the shaft 31 over which passes a belt 38. The belt 38 passes over a pulley 39 on the end of a jack shaft 41. The shaft 41 is driven by means of gears 42 and 43 from the motor 37.

From what has so far been described it will be apparent that the belts 17 and 18 are supported with their upper flight 17a and their lower flight 18a, respectively, spaced apart a distance to receive between them strands of candy or other material to be rotated. In order to aid in the initial feeding of the end of the strip between the flights 17a and 18a, I provide guides 44 and 46 which are supported at each end on the pins or the like 47 and 48 from the plate 11. However, and as will appear, when the apparatus is in operation, the candy seldom if ever touches the guides.

The candy to be rotated and twisted is fed from any suitable device such for instance as a round guide 49. The candy is fed onto a stationary trough-like guide 51 which directs it between the belt surfaces 17a and 18a. A receiving guide 52 receives the candy after it passes between the belt surfaces. Due to the crossed relationship of the belt flights the rope or strand of candy is given both a rotative and axial movement while between the belts. In fact, I have found in actual practice that the candy is fed at a very even rate of rotation, and at a very even relative rate of axial movement, depending upon the angle at which the belts cross each other. As best shown in Fig. 1, in actual practice it is preferable from the standpoint of appearance of the product, that the belts be crossed so that the angle between the longitudinal axis of the candy and a line drawn tangent to the stripe is about 38°. Therefore, the angles between the directions of movement of the belts on the entering side adjacent the guide 51 should be always less than 180°. Stated differently, the angles A shown in Fig. 2, which are the angles between the longitudinal axis of the candy and the center lines of the belts, should be always less than 90°.

After delivery from the guide or receiving trough 52 the candy is cut into lengths and discharged by the apparatus now to be described.

Mounted beneath the plate 11 is a shaft 53 which extends parallel to the direction of movement of the candy through the apparatus. The shaft is supported on links 54 and 56, there being pivotal connections 57 and 58 between the links and the shaft. The links are pivotally supported in brackets 59 and 61.

At the rear end of the shaft 53 is another link 62 which is pivotally connected to the shaft 53 at 63. The link 62 extends downwardly and is provided with a slot 64 therein. Connected to the link 62 by means of a nut 60 is the reduced end 66 of a bearing pin 65. The bearing pin 65 has a threaded outer end to receive a nut 65a. Pivotally mounted on the bearing pin 65 is one end of an arm 67 the other end of which is pivotally mounted at 68 to a bracket 69 fast on the end wall 12 of the base.

Pivotally connected at 71 to the lower end of the arm 62 is a connecting rod 72. The other end of the connecting rod 72 is connected to a pin 73 which projects outwardly from the side of a cam 74 which is fast on a shaft 76 supported in suitable bearings 77. The shaft 76 carries a pulley 78 which is driven by a belt 79 from a pulley, not shown, on the motor shaft 36.

From what has just been described it will be seen that the shaft 76 rotates in timed relation to the movement of the belts 17 and 18. As the cam 74 rotates pin 73 moves around in a circle, oscillating the lower end of arm 62. This movement moves shaft 53 back and forth, the amount of the movement being determined by the position of the bearing pin 65 in the slot 64. Shaft 53 serves as a supporting member for the shears and discharge mechanism now to be described.

Mounted on the shaft 53 are knife holders 81 and 82. The knife holders or arms carry cutting knives 83 which are adapted to engage the strand S and cut it into the lengths C.

Pivoted to and depending from arm 81 is a link 84. A similar link 86 depends from the end of arm 82. The links 84 and 86 are connected by a cross rod 87 which extends over a cam 88 having a lobe 89 thereon. Springs 91 hold the cross rod 87 in contact with the surface of cam 88. Therefore, as the cam 88 rotates in response to rotation of shaft 76, on which it is fast, the knife arms move up, bringing the cutters together and cutting the strand S into the lengths C, all as will be described.

Mounted on shaft 53 to pivot relative thereto are outstanding arms 92 and 93. Upstanding from the arms 92 and 93 are generally vertically directed arms 94 which carry on their upper ends a brass cross bar 96.

Pivotally connected to the arm 92 as at 97 is a push rod 98 which carries a roller 99 on its lower end. The roller 99 cooperates with the cam 74 which has a lobe 101 thereon.

Figure 7:
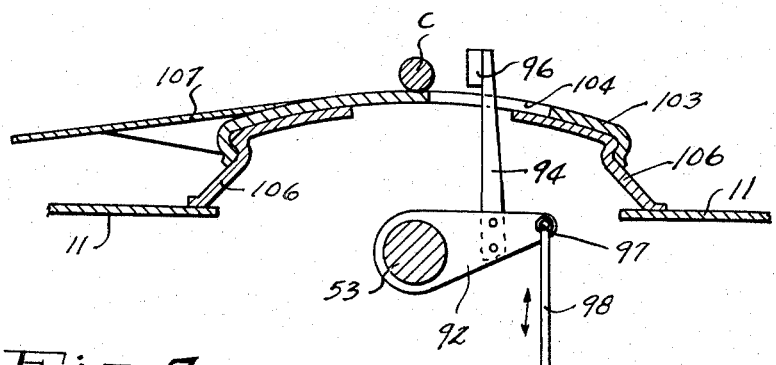
Fig. 7 is an enlarged detail sectional view taken generally along line VII—VII of Fig. 4.

The upper ends of the knife arms 81 and 82 project through a slot 102 formed in a plate 103. Likewise, the arms 94 project upwardly through slots 104 in the plate 103. The plate 103 is mounted for axial sliding movement in guides 106 fast on top of the top plate 11 of the base. See Fig. 7. A lateral plate 107 forms a runway down which the candy sticks C roll in the manner presently to be described.

From the foregoing description the method of using my improved apparatus can now be explained and understood. It will be understood that the candy containing the large size white strip and the relatively small size red or other colored strip is fed axially outwardly while held against rotation, through the guide or other holding device 49. The candy feeds onto the guide 51 and then between the flights of the belts 17 and 18 as indicated, it being understood that the flights 17a and 18a are spaced close enough together to engage opposite surfaces of the round strand, thereby frictionally to engage the strand and rotate it. Due to the crossed arrangement of the belts the strand is engaged with rotating forces having an axial component. It will be understood that the belts are driven in directions to cause the flights 17a and 18a to move as indicated by the arrows, that is, generally away from the guide 51. The candy therefore proceeds straight through the belts and enters the guide 52. Due to the several cams and the linkage arrangement already described the plate 103 together with the cutters and the discharge bar 96 all move in timed relation. Thus, as the strip S is fed between the knives or cutters 83, the entire knife assembly and the top plate 103 together with the bar 96 move with the candy, due to the supports 54 and 56 and the connecting rod arrangement 72 and link 62. Therefore, the knives shear the candy to form the length C and, due to the timing of the cams, as soon as this is sheared the link 98 moves upwardly, rocking the brass plate 96 against the severed length, rolling the length down the plate 107. It will be noted that the candy thus is moved laterally of its direction of movement through the remainder of the apparatus. The length of the stroke of the shaft 53 and hence the axial movement of the assemblies carried thereby can be regulated by loosening the nut 60 and moving the bearing pin 65 up or down in the slot 64.

From the foregoing it will be apparent that I have devised an improved apparatus for rotating a round strand of material and for twisting the same if desired, together with means for cutting the strand into lengths. It will be noted that the actual twisting takes place between the holding means formed by the guide or the like 49, and the surfaces of the belts. In actual operation my improved apparatus has proved to be extremely satisfactory in every way. My invention is particularly adapted for the manufacture of "barber pole" candy and the like. As has been stated, the larger sizes of say up to 1¾ inches in diameter heretofore have been the most difficult sizes to make with prior processes and apparatus. With my improved apparatus I find them to be very easy to make and furthermore I have found that the appearance of the finished product is even with respect to diameter and twist. My improved apparatus is very simple of manufacture and trouble free in operation.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In apparatus for receiving an axially moving strand and cutting it into lengths, a shear for cutting the strand, a discharge member adapted to engage the side of a cut length of the strand and push it laterally of its original direction of movement, a common member supporting said shear and discharge member, means to reciprocate the common member in a direction axially away from the direction of the oncoming strand, and means sequentially to operate the shear and discharge member, whereby the strand is cut into lengths which then are removed laterally of the direction of movement of the strand.

2. In apparatus of the character designated, a supply member from which a length of continuously moving strand is fed, a support member for a shear and a severed length discharge member, means supporting the support member for reciprocation in a path parallel to the axial direction of movement of the strand and with the strand passing into the shear, means to operate the shear while the support member is moving with the strand, and means to operate the discharge member after a length of the strand has been cut and in a direction to discharge the cut length laterally of the path of movement of the strand.

3. Apparatus as defined in claim 2 in which there is means to adjust the length of the stroke of said support member.

4. In apparatus for receiving an axially moving strand of material and cutting it into relatively short lengths, a shear into which the strand is fed, a length discharge member located rearwardly of the shear with respect to movement of the strand, a common member on which the shear and discharge member are operatively mounted, means supporting the common member for reciprocation in a direction axially of the moving strand, means mounting the discharge member on the common member for movement against a side of the severed lengths of strand, thereby to move them laterally of the path of movement of the strand, and power means for closing the shear onto the strand during movement of the shear with the strand and for subsequently actuating the discharge member.

References Cited in the file of this patent

UNITED STATES PATENTS

| | | |
|---|---|---|
| 1,138,576 | Knott | May 4, 1915 |
| 1,318,292 | Laskey | Oct. 7, 1919 |
| 1,640,868 | Zaiss | Aug. 30, 1927 |
| 1,792,672 | Zaiss | Feb. 17, 1931 |
| 1,871,753 | Smith | Aug. 16, 1932 |
| 1,949,835 | James et al. | Mar. 6, 1934 |
| 2,010,486 | Herrmann | Aug. 6, 1935 |
| 2,101,570 | Bolen | Dec. 7, 1937 |
| 2,118,508 | Gwinn et al. | May 24, 1938 |
| 2,124,397 | Gwinn et al. | July 19, 1938 |